(12) United States Patent
Itoh

(10) Patent No.: US 9,404,204 B2
(45) Date of Patent: *Aug. 2, 2016

(54) FLEXIBLE, ABRASION RESISTANT TEXTILE SLEEVE AND METHOD OF CONSTRUCTION THEREOF

(71) Applicant: Federal-Mogul Powertrain, Inc., Southfield, MI (US)

(72) Inventor: Emi Itoh, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,832

(22) Filed: Dec. 3, 2014

(65) Prior Publication Data

US 2015/0083268 A1  Mar. 26, 2015

Related U.S. Application Data

(63) Continuation of application No. 13/837,136, filed on Mar. 15, 2013, now Pat. No. 8,925,592, which is a continuation-in-part of application No. 12/797,798, filed on Jun. 10, 2010, now abandoned.

(60) Provisional application No. 61/186,174, filed on Jun. 11, 2009.

(51) Int. Cl.
*D03D 3/02* (2006.01)
*D03D 1/00* (2006.01)
(Continued)

(52) U.S. Cl.
CPC  *D03D 3/02* (2013.01); *B60R 16/02* (2013.01); *B60R 16/0215* (2013.01);
(Continued)

(58) Field of Classification Search
CPC ... H02G 3/0481; H02G 15/18; D03D 13/004; D03D 1/0041; D03D 3/02; D03D 15/00; D03D 17/00; D03D 13/00; D03D 13/008

USPC ...... 139/383 R, 384 R, 386, 387 R, 390, 388, 139/420 R, 421, 422, 426 R, DIG. 1
See application file for complete search history.

(56) References Cited

U.S. PATENT DOCUMENTS 3,804,479 A * 4/1974 Butzow et al. ................ 384/300
4,660,605 A * 4/1987 Koch ......................... 139/420 R
(Continued)

FOREIGN PATENT DOCUMENTS

| CN | 1038018 | 12/1989 |
| CN | 1671895 | 9/2005 |

(Continued)

OTHER PUBLICATIONS

International Search Report mailed Jul. 22, 2014 (PCT/US2014/019718).

*Primary Examiner* — Bobby Muromoto, Jr.
(74) *Attorney, Agent, or Firm* — Dickinson Wright, PLLC; Robert Stearns

(57) ABSTRACT

A textile sleeve for routing and protecting elongate members and method of construction thereof is provided. The sleeve has a flexible, abrasion resistant, self-curling elongate wall constructed from woven monofilament and multifilament yarns. The wall has opposite edges extending parallel to a central axis of the sleeve. The wall is woven with warp yarns extending parallel to the central axis and fill yarns extending transverse to the warp yarns. The warp yarns are provided at least in part as first monofilament yarns and the fill yarns are provided as second monofilament yarns and second multifilament yarns. The second monofilament yarns have a larger diameter than the first monofilament yarns.

17 Claims, 5 Drawing Sheets

(51) Int. Cl.
  B60R 16/02 (2006.01)
  D03D 3/08 (2006.01)
  D03D 15/00 (2006.01)
  D06C 7/02 (2006.01)
  D03D 23/00 (2006.01)
  D03D 25/00 (2006.01)
  H02G 3/04 (2006.01)

(52) U.S. Cl.
  CPC .............. *D03D 1/0041* (2013.01); *D03D 3/08* (2013.01); *D03D 15/00* (2013.01); *D06C 7/02* (2013.01); *D10B 2331/04* (2013.01); *D10B 2331/301* (2013.01); *D10B 2401/04* (2013.01); *H02G 3/0481* (2013.01)

(56) References Cited

U.S. PATENT DOCUMENTS

| | | | |
|---|---|---|---|
| 5,167,263 A | 12/1992 | Kelen | |
| 5,413,149 A * | 5/1995 | Ford et al. | 138/123 |
| 5,843,542 A * | 12/1998 | Brushafer et al. | 428/36.1 |
| 6,328,080 B1 * | 12/2001 | Winters | 139/388 |
| 7,188,642 B2 * | 3/2007 | James et al. | 139/384 R |
| 7,216,678 B2 * | 5/2007 | Baer | 139/384 R |
| 8,925,592 B2 * | 1/2015 | Itoh | 139/384 R |
| 2004/0154676 A1 * | 8/2004 | Wilkinson | 138/125 |
| 2005/0185902 A1 | 8/2005 | James et al. | |
| 2006/0016507 A1 * | 1/2006 | Baer | 139/383 R |
| 2007/0166495 A1 | 7/2007 | Sellis et al. | |
| 2007/0275199 A1 | 11/2007 | Chen | |
| 2008/0006432 A1 | 1/2008 | Yamaguchi et al. | |
| 2008/0054236 A1 | 3/2008 | Morris | |
| 2008/0075983 A1 | 3/2008 | Chen | |
| 2008/0124976 A1 | 5/2008 | Rodrigues et al. | |
| 2008/0135119 A1 | 6/2008 | Tonooka et al. | |
| 2009/0050226 A1 | 2/2009 | Mirmand et al. | |
| 2009/0218002 A1 * | 9/2009 | Kashihara | 139/433 |
| 2012/0037263 A1 | 2/2012 | Malloy | |

FOREIGN PATENT DOCUMENTS

| | | |
|---|---|---|
| CN | 101052760 | 10/2007 |
| JP | 2003506579 | 2/2003 |
| WO | 2007103779 A2 | 9/2007 |

* cited by examiner

FLEXIBLE, ABRASION RESISTANT TEXTILE SLEEVE AND METHOD OF CONSTRUCTION THEREOF

CROSS-REFERENCE TO RELATED APPLICATION

This application is continuation of U.S. application Ser. No. 13/837,136, filed Mar. 15, 2013, which is a continuation-in-part of U.S. application Ser. No. 12/797,798, filed Jun. 6, 2010, which claims the benefit of U.S. Provisional Application Ser. No. 61/186,174, filed Jun. 11, 2009, all of which are incorporated herein by reference in their entirety.

BACKGROUND OF THE INVENTION

1. Technical Field

This invention relates generally to textile sleeves for protecting elongate members, and more particularly to woven sleeves.

2. Related Art

It is known to wrap wires and wire harnesses in protective sleeves, such as in automobiles, aircraft or aerospace craft, to provide protection to the wires against abrasion, fluid and thermal affects. In order to achieve the desired protection, the protective sleeve may have multiple layers, with some of the layers being specifically provided for different types of protection. For example, one layer may be provided for water resistance, e.g. a sheet of plastic material, while another layer may be provided for abrasion resistance, and yet another layer may be provided for protection against thermal conditions, e.g. a non-woven layer. Unfortunately, although the aforementioned multilayer sleeves may provide suitable protection against the various environmental conditions, they are typically bulky, thereby requiring an increased volume of space, being relatively heavy and exhibiting limited flexibility, thereby being subject to kinking and opening along wrapped edges. Other known woven sleeves 1 in addition to the multilayer sleeves discussed above also exhibit hoop strength and kinking issues when bent about corners and into a generally u-shaped configuration, such as shown in FIG. 7, thereby potentially exposing the member 2 contained in a cavity 3 of the sleeve 1 to contamination. This is made possible as a result of the relatively inflexible, rigid edges 4 being opened away from one another as the sleeve 1 is bent. Accordingly, wrappable sleeves constructed in accordance with the prior art can prove problematic in some applications, particularly applications requiring routing through tight, winding areas, and applications having weight restrictions, such as aircraft and aerospace applications, for example.

SUMMARY OF THE INVENTION

One aspect of the invention provides a woven sleeve for routing and protecting elongate members from exposure to abrasion and other environmental conditions, such as contamination. The sleeve has a flexible, abrasion resistant, self-curling elongate wall constructed from woven monofilament and multifilament yarns. The wall has opposite edges extending parallel to a central axis of the sleeve. The wall is woven with warp yarns extending parallel to the central axis and fill yarns extending transverse to the warp yarns. The warp yarns are provided at least in part as first monofilament yarns and the fill yarns are provided as second monofilament yarns and second multifilament yarns. The second monofilament yarns have a larger diameter than the first monofilament yarns.

In accordance with another aspect of the invention, the warp yarns further include first multifilament yarns that extend over an edge region adjacent the opposite edges to assist in preventing the opposite edges from opening when the sleeve is bent around a corner, wherein the first monofilament yarns extend over an intermediate region between the edge regions to provide enhanced resistance to abrasion, with the edge regions being free of the first monofilament yarns, further enhancing the ability of the sleeve wall to remain in its intended wrapped configuration.

In accordance with another aspect of the invention, the second monofilament yarns are heat set to bias the opposite edges into overlapping relation with one another.

In accordance with yet another aspect of the invention, a method of constructing a textile sleeve wrappable about a central axis is provided. The method includes providing first monofilament yarns having a first diameter; providing second monofilament yarns having a second diameter that is larger than the first diameter to enhance the curl-strength of the sleeve; and providing second multifilament yarns. Then, weaving an elongate wrappable wall having opposite edges extending parallel to the central axis with the first monofilament yarns forming warp yarns extending parallel to the central axis and the second monofilament and second multifilament yarns forming fill yarns extending transverse to the warp yarns.

In accordance with another aspect of the invention, the method further includes providing first multifilament yarns and weaving the first multifilament yarns to form warp yarns extending along edge regions adjacent the opposite edges to assist in maintaining the opposite edges in their intended overlapping relation when the sleeve is bent around a corner.

In accordance with another aspect of the invention, the method further includes heat setting the increased diameter second monofilament yarns to bias the opposite edges into overlapping relation with one another.

A sleeve constructed in accordance with the invention not only provides enhanced protection to elongate members contained therein, but is economical in manufacture, and has an enhanced ability to remain in its self-curled configuration about the elongate members.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
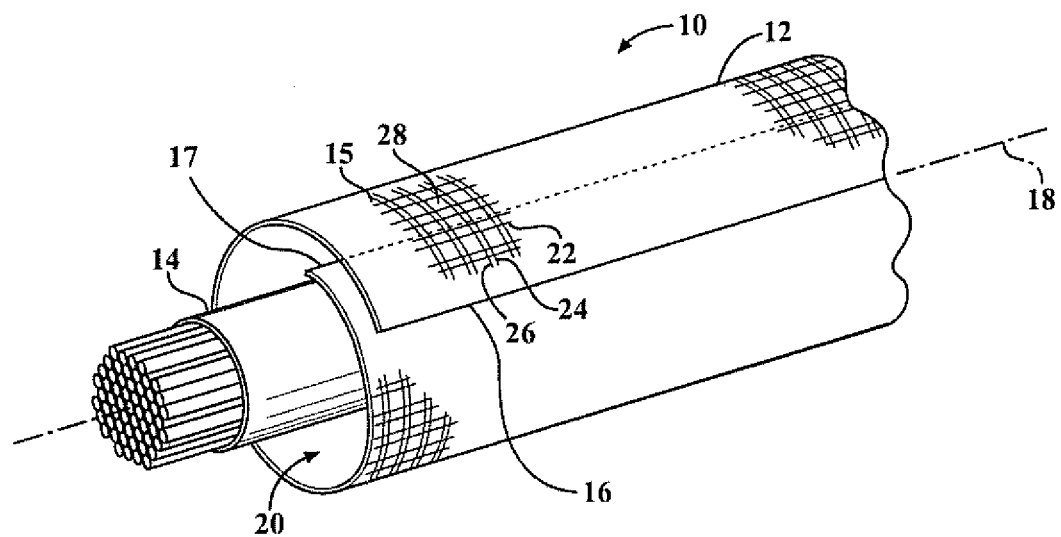
FIG. 1 is a schematic perspective view of a woven, self-wrapping sleeve constructed in accordance with one aspect of the invention carrying and protecting elongate members therein.
Figure 2:
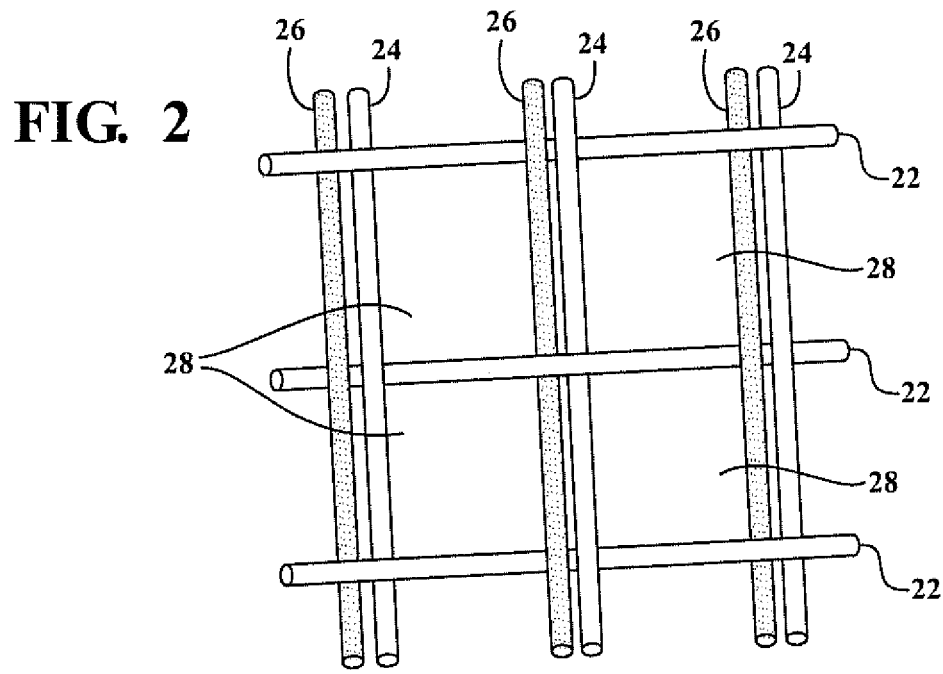
FIG. 2 is an enlarged partial view of a wall of the sleeve of FIG. 1.

Referring in more detail to the drawings, FIG. 1 shows schematic representation of a woven, self-wrapping textile sleeve, referred to hereafter as sleeve 10, constructed in accordance with one aspect of the invention. The sleeve 10 has a self-wrapping elongate wall 12 for routing and protecting elongate members, such as wires or a wire harness 14, for example, from exposure to abrasion and the ingress of contamination, debris and the like. The elongate wall 12 has opposite edges 16, 17 extending generally parallel to a central, longitudinal axis 18, wherein the edges 16, 17 are preferably biased into overlapping relation with one another in "cigarette wrapped" fashion to fully enclose the elongate members 14 within a central cavity 20 of the sleeve. The cavity 20 is readily accessible along the full length of the longitudinal axis 18 so that the elongate members 14 can be readily disposed radially into the cavity 20, and conversely, removed from the cavity 20, such as during service. To provide protection to the elongate members 14 against abrasion, the wall 12 is woven with warp yarns 22 provided as monofilament yarns and fill yarns 24 provided as monofilament yarns, wherein the fill monofilament yarns 24 provide additional, enhanced protection to the elongate members 14 against abrasion, while also providing the bias to self-curl the opposite edges 16, 17 in overlapping relation with one another. The bias is imparted by heat-setting the fill monofilament yarns 24 into their curled configuration about the central axis 18. In addition to the fill monofilament yarns 24, the wall 12 has fill yarns 26 provided as multifilament yarns. The multifilament yarns 26 provide additional surface area coverage of the wall 12 to the elongate members 14 and inhibit ingress of contamination, debris, or the like into the cavity 20, thereby providing enhanced protection to the elongate members 14. In addition, the multifilament yarns 26 maintain the warp monofilaments 22 in place in their intended, as woven position by imparting friction on the warp monofilaments 22, while providing the sleeve 10 with sufficient flexibility for routing around corners, for example.

Depending on the application needs, the wall 12 can be constructed having any suitable size, including length and diameter. When the wall 12 is in its self-wrapped tubular configuration, generally free from any externally applied forces, the edges 16, 17 preferably overlap one another at least slightly to fully enclose the cavity 20, and thus, provide enhanced protection to the wires 14 contained in the cavity 20. The edges 16, 17 are readily extendable away from one another under an externally applied force sufficient to overcome the bias imparted by the fill monofilament yarns 24 to at least partially open and expose the cavity 20. Accordingly, the wires 14 can be readily disposed into the cavity 20 during assembly or removed from the cavity 20 during service. Upon releasing the externally applied force, the edges 16, 17 return automatically to their natural, overlapping self-wrapped position under the bias imparted by the heat-set fill monofilament yarns 24.

The monofilament yarns 22, 24 can be provided as any suitable heat-settable polymeric material, such as polyphenylene sulfide (PPS) or polyethyleneterephthalate (PET), for example. In one exemplary sleeve embodiment, the monofilament yarns 22, 24 were provided as PET having a diameter of about 0.22 mm. The wall 12 was formed having a width (dimension extending between the edges 16, 17 with the wall 12 in a flattened state) of about 42 mm, and the number of ends of the warp monofilaments 22 was 48. The fill monofilament yarns 24 and the fill multifilament yarns 26 were dual inserted having a pick per inch (PPI) of 10, however, a PPI between about 8-12 is considered to be within a workable range. With such a low PPI, interstices 28 are formed within the wall 12. Accordingly, the monofilament and multifilament fill yarns 24, 26 provide discrete pairs of the circumferentially extending monofilament and multifilament fill yarns spaced axially along the central axis 18 from one another by the interstices 28 extending axially therebetween. The multifilament yarns 26 were provided having a denier of about 1250. The yarns 22, 24, 26 were woven using a plain weave which resulted in the sleeve 10 having a wall thickness of about 0.6 mm. In yet another exemplary sleeve embodiment, the number of ends of the warp monofilaments 22 was 52, with all other yarn factors remaining the same. It should be recognized that these yarn factors can be modified by one skilled in the art in dimension and number, while maintaining the warp yarns 22 as purely monofilaments and the fill yarns 24, 26 as a combination of monofilaments and multifilaments, while remaining within the spirit and scope of the invention.

With the warp yarns 22 being provided as purely monofilaments, the abrasion resistance of the sleeve assembly 10 is enhanced. Further, with some of the fill yarns 24 being provided as monofilaments, additional protection against abrasion is provided. Further yet, with some of the fill yarns 26 being provided as multifilaments, added surface area coverage is provided to the wall 12 to the elongate members 14, thereby further protecting the cavity 20 against ingress of contamination, and further, the multifilaments act to maintain the warp monofilaments 22 in their intended location, even under external abrasion force.

Figure 3:
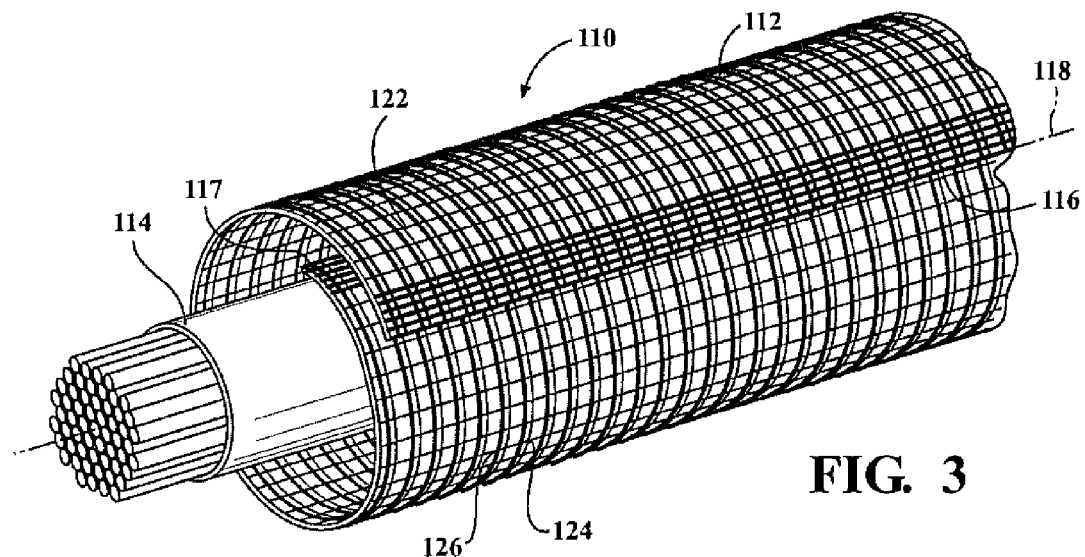
FIG. 3 is a schematic perspective view of a woven, self-wrapping sleeve constructed in accordance with another aspect of the invention carrying and protecting elongate members therein.
Figure 3A:
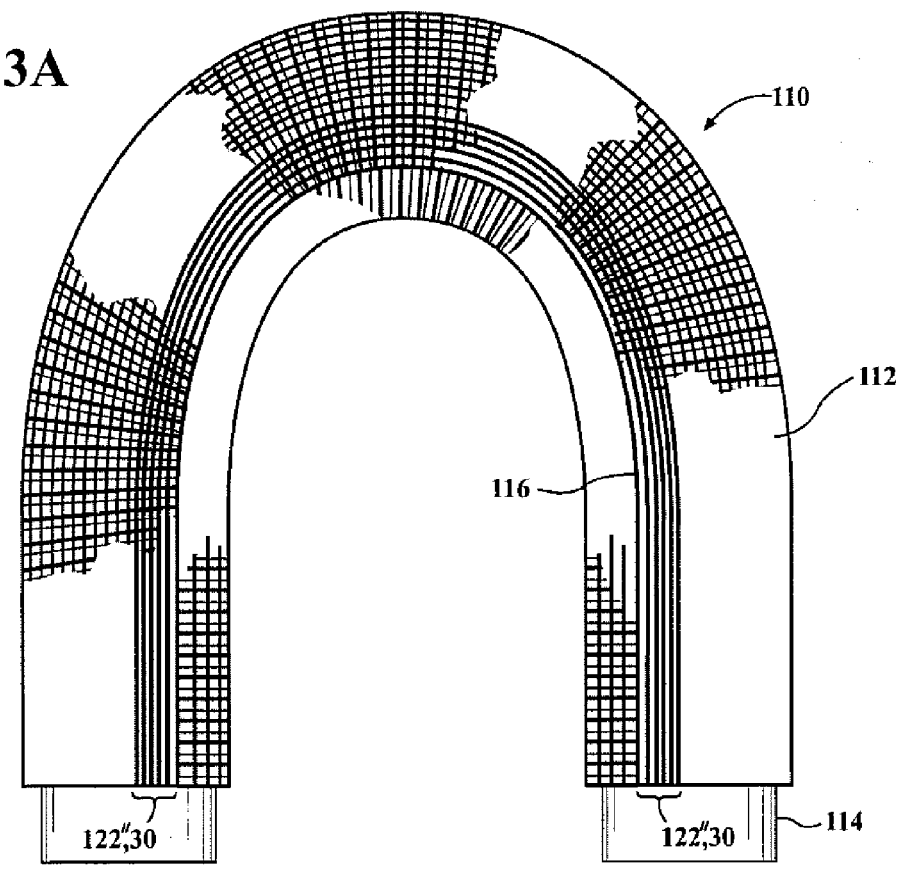
FIG. 3A is a side view of the sleeve of FIG. 3 shown bent into a u-shape.

FIG. 3 illustrates a woven, self-wrapping textile sleeve, referred to hereafter as sleeve 110, constructed in accordance with another aspect of the invention, wherein the same reference numerals as used above, offset by a factor of 100, identify like features.

The sleeve 110 has a self-wrapping wall 112, as heat-formed, woven with warp yarns 122 provided as first monofilament yarns 122' and first multifilament yarns 122" and fill yarns 124 provided as second monofilament yarns 124' and second multifilament yarns 126. As discussed above, the second fill monofilament yarns 124' provide additional, enhanced protection to the elongate members 114 against abrasion, while also providing the bias to self-curl opposite edges 116, 117 of the wall in overlapping relation with one another upon being heat-set into their curled configuration about a central axis 118 of the sleeve 110. The second multifilament yarns 126 provide additional surface area coverage and maintain the warp first monofilament yarns 122' in place in their intended, as woven position, while providing the sleeve 110 with sufficient flexibility for routing around corners, for example, as discussed above for the sleeve 10.

Figure 4:
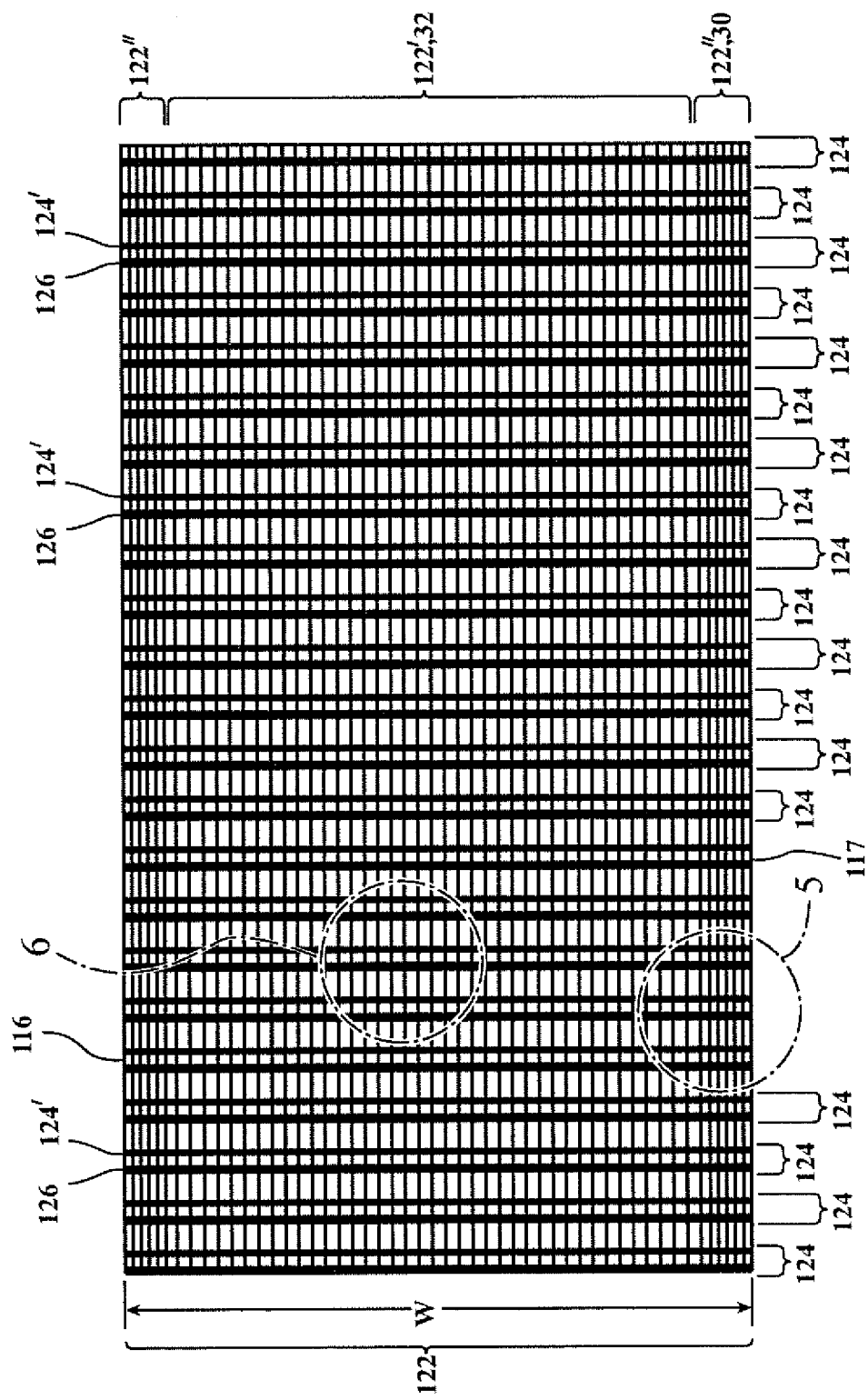
FIG. 4 is a plan view of the sleeve of FIG. 3 showing a wall of the sleeve in an unwrapped state.
Figure 5:
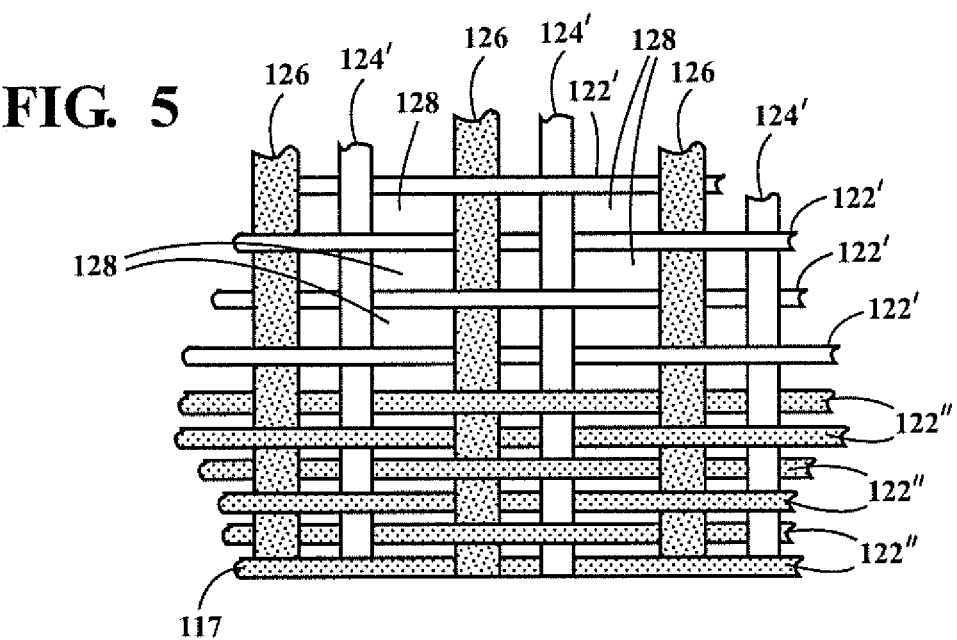
FIG. 5 is an enlarged view of the encircled area 5 of FIG. 4.
Figure 6:
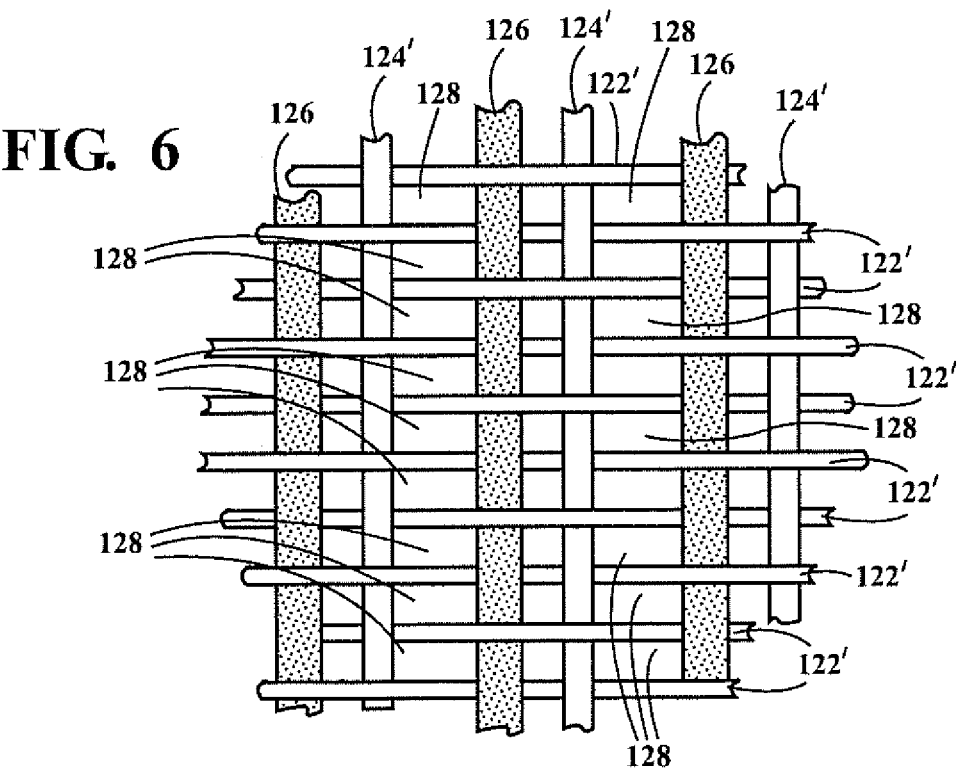
FIG. 6 is an enlarged view of the encircled area 6 of FIG. 4.
Figure 7:
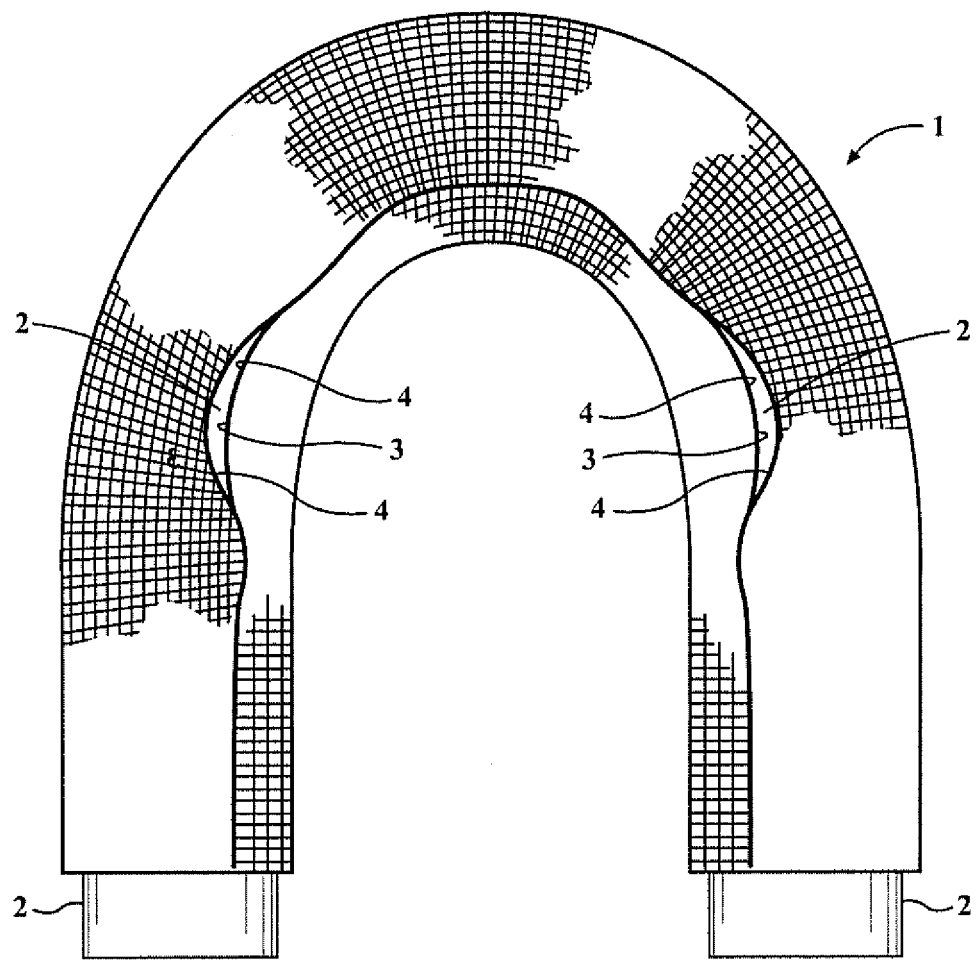
FIG. 7 is a side view of a wrappable sleeve constructed in accordance with the prior shown bent into a u-shape.

The first and second monofilament yarns 122', 124' can be provided as any suitable heat-settable polymeric material, such as polyphenylene sulfide (PPS) or polyethyleneterephthalate (PET), for example. In one exemplary sleeve embodiment, the first and second monofilament yarns 122', 124' were provided as PET having diameters of about 0.22 mm and 0.38 mm, respectively. Accordingly, the diameter of the second monofilament yarns 124' extending in the fill direction have a larger diameter than the first monofilament yarns 122' extending in the warp direction. Preferably, the diameters of the second monofilament yarns 124' are about 40 percent larger than the diameter of the first monofilament yarns 122'. In one example, the wall 112 was formed having a width W (dimension extending between the edges 116, 117 with the wall 112 in a flattened state, as shown in FIG. 4) of about 42 mm, and the number of total ends of the warp yarns was 52. The total number of warp ends is broken down in to three discrete regions, with there being two edge regions 30 adjacent to and extending directly along the opposite edges 116, 117 and an intermediate region 32 extending between the opposite edge regions 30. The warp yarns 122 in the edge regions 30 each comprise only first multifilament yarns 122" and the warp yarns in the intermediate region 32 comprise only first monofilament yarns 122'. Accordingly, the opposite edge regions 30 do not include monofilament yarns, which has been found to enhance the ability of the edges 116, 117 to remain in their intended configuration upon being routed about corners, and the intermediate region 32 does not include multifilament yarns, thereby enhance the resistance to abrasion. In the exemplary sample, the total number of ends of yarn in each of the edge regions was 6, and the total number of ends or yarn in the intermediate region was 40, for a combined total of 52 ends of yarn.

As with the sleeve 10, the second monofilament yarns 124' and the second multifilament yarns 126 were dual inserted with one another having a pick per inch (PPI) of 10, however, a PPI between about 8-12 is considered to be within a workable range. With such a low PPI, interstices 128 are formed within the wall 112. Accordingly, the second monofilament and second multifilament fill yarns 124', 126 provide discrete pairs of the circumferentially extending monofilament and multifilament fill yarns 124', 126 spaced from one another axially along the central axis 118 by the interstices 128 extending therebetween. The first and second multifilament yarns 122", 126 were provided having a denier of about 1250. The warp and fill yarns 122, 124 were woven using a plain weave which resulted in the sleeve 10 having a wall thickness of about 0.9 mm. It should be recognized that these yarn factors can be modified by one skilled in the art in dimension and number, while remaining within the spirit and scope of the invention.

Obviously, many modifications and variations of the present invention are possible in light of the above teachings. It is, therefore, to be understood that within the scope of the appended claims, the invention may be practiced otherwise than as specifically described.

What is claimed is:

1. A textile sleeve for routing and protecting elongate members, comprising:
   an elongate wall having opposite edges extending parallel to a central axis of the sleeve, said wall being woven with warp yarns extending parallel to said central axis and fill yarns extending transverse to said warp yarns, said warp yarns being provided at least in part as first monofilament yarns and said fill yarns being provided as second monofilament yarns and second multifilament yarns, said second monofilament yarns having a larger diameter than said first monofilament yarns.

2. The textile sleeve of claim 1 wherein said second monofilament yarns have a diameter about 40 percent larger than said first monofilament yarns.

3. The textile sleeve of claim 1 wherein said warp yarns further include first multifilament yarns.

4. A textile sleeve for routing and protecting elongate members, comprising:
   an elongate wall having opposite edges extending parallel to a central axis of the sleeve, said wall being woven with warp yarns extending parallel to said central axis and fill yarns extending transverse to said warp yarns, said warp yarns being provided at least in part as first monofilament yarns and said fill yarns being provided as second monofilament yarns and second multifilament yarns, said second monofilament yarns having a larger diameter than said first monofilament yarns, wherein said warp yarns further include first multifilament yarns, and wherein said first multifilament yarns extend over an edge region adjacent said opposite edges and said first monofilament yarns extend over an intermediate region between said edge regions, said edge regions being free of said first monofilament yarns.

5. The textile sleeve of claim 4 wherein said warp yarns in said intermediate region comprise only monofilament yarns.

6. The textile sleeve of claim 4 wherein said first multifilament yarns are heat-shrunk in length.

7. The textile sleeve of claim 1 wherein said second monofilament yarns and said second multifilament fill yarns are dual inserted with said warp yarns to provide discrete pairs of said second monofilament yarns and said second multifilament fill yarns spaced axially from one another along said central axis.

8. The textile sleeve of claim 1 wherein said second monofilament fill yarns are heat set to bias the wall into a curled configuration about said central axis.

9. A method of constructing a textile sleeve wrappable about a central axis, comprising:
   providing first monofilament yarns having a first diameter;
   providing second monofilament yarns having a second diameter, said second diameter being larger than said first diameter;
   providing second multifilament yarns; and
   weaving an elongate wrappable wall having opposite edges extending parallel to the central axis with the first monofilament yarns forming warp yarns extending parallel to the central axis and the second monofilament yarns and second multifilament yarns forming fill yarns extending transverse to the warp yarns.

10. The method of claim 9 further including dual inserting the second monofilament and second multifilament fill yarns with the first monofilament yarns to provide discrete pairs of the second monofilament and second multifilament fill yarns spaced from one another along the central axis.

11. The method of claim 9 further including heat-setting the second monofilament fill yarns to bias the wall into a curled configuration about the central axis.

12. The method of claim 9 further including providing first multifilament yarns and weaving the first multifilament yarns to form warp yarns extending along edge regions adjacent the opposite edges.

13. A method of constructing a textile sleeve wrappable about a central axis, comprising:
   providing first monofilament yarns having a first diameter;
   providing second monofilament yarns having a second diameter, said second diameter being larger than said first diameter;
   providing second multifilament yarns;
   weaving an elongate wrappable wall having opposite edges extending parallel to the central axis with the first monofilament yarns forming warp yarns extending parallel to the central axis and the second monofilament yarns and second multifilament yarns forming fill yarns extending transverse to the warp yarns;
   further including providing first multifilament yarns and weaving the first multifilament yarns to form warp yarns extending along edge regions adjacent the opposite edges; and
   further including providing all the warp yarns in the edge regions as multifilament yarns.

14. The method of claim 13 further including providing all the warp yarns in an intermediate region between the edge regions as monofilament yarns.

15. The method of claim 9 further including heat-forming the second monofilament yarns to cause the opposite edges to be biased in overlapping relation with one another.

16. A textile sleeve for routing and protecting elongate members, comprising:

an elongate wall having opposite edges extending parallel to a central axis of the sleeve, said wall being woven with warp yarns extending parallel to said axis and fill yarns extending transverse to said warp yarns, said warp yarns being provided solely as monofilament yarns and said fill yarns being provided as monofilament yarns and multifilament yarns.

17. The textile sleeve of claim 16 wherein said monofilament and multifilament fill yarns are dual inserted with said warp yarns to provide discrete pairs of said monofilament and multifilament fill yarns spaced axially along said central axis from one another by interstices.

\* \* \* \* \*